US011480387B2

(12) United States Patent
Ito

(10) Patent No.: US 11,480,387 B2
(45) Date of Patent: Oct. 25, 2022

(54) COLD STORAGE BOX AND COLD STORAGE BOX MANAGEMENT SYSTEM

(71) Applicant: TAKETOMO, INC., Tokyo (JP)

(72) Inventor: Hiroaki Ito, Tokyo (JP)

(73) Assignee: TAKETOMO, INC.

( * ) Notice: Subject to any disclaimer, the term of this patent is extended or adjusted under 35 U.S.C. 154(b) by 300 days.

(21) Appl. No.: 16/628,823

(22) PCT Filed: Mar. 29, 2018

(86) PCT No.: PCT/JP2018/013164
§ 371 (c)(1),
(2) Date: Jan. 6, 2020

(87) PCT Pub. No.: WO2019/030969
PCT Pub. Date: Feb. 14, 2019

(65) Prior Publication Data
US 2020/0132362 A1   Apr. 30, 2020

(30) Foreign Application Priority Data

Aug. 9, 2017   (JP) .............................. JP2017-154134

(51) Int. Cl.
*F25D 27/00*   (2006.01)
*B07C 5/34*    (2006.01)
(Continued)

(52) U.S. Cl.
CPC .............. *F25D 27/005* (2013.01); *B07C 5/34* (2013.01); *B07C 5/36* (2013.01); *B65D 25/20* (2013.01);
(Continued)

(58) Field of Classification Search
CPC ............. F25D 2700/08; F25D 2700/02; F25D 2700/10; B65D 2585/6842
See application file for complete search history.

(56) References Cited

U.S. PATENT DOCUMENTS

2003/0034390 A1* 2/2003 Linton ...................... G07F 9/02
235/382
2004/0212479 A1* 10/2004 Gilbert ............... G05B 23/0205
340/10.34

(Continued)

FOREIGN PATENT DOCUMENTS

CN   102368011 A    3/2012
CN   106073047 A *  11/2016
(Continued)

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

A cold storage box is provided that allows individual confirmation that stored objects such as medicine, food, and beverages have been managed at an appropriate temperature. The cold storage box 1 includes: a storage part which can house stored objects; a lid part which covers an opening part of the storage part; and a cooling device which cools the storage part, and the cold storage box includes an RF tag provided for each of the stored objects and equipped with a temperature sensor and a control part which communicates with the RF tag at appropriate time intervals via an antenna part provided inside the storage part and stores ID information of the RF tag and temperature information sensed by the temperature sensor of the RF tag.

15 Claims, 4 Drawing Sheets

(51) Int. Cl.
 *B07C 5/36* (2006.01)
 *B65D 25/20* (2006.01)
 *B65D 81/18* (2006.01)
 *B65D 81/38* (2006.01)
 *F25D 11/00* (2006.01)

(52) U.S. Cl.
 CPC ............ *B65D 81/18* (2013.01); *B65D 81/38* (2013.01); *F25D 11/003* (2013.01); *B65D 2203/10* (2013.01); *B65D 2203/12* (2013.01); *F25D 2700/02* (2013.01); *F25D 2700/08* (2013.01); *F25D 2700/12* (2013.01)

(56) References Cited

U.S. PATENT DOCUMENTS

| | | | | |
|---|---|---|---|---|
| 2005/0248455 | A1* | 11/2005 | Pope | G06Q 30/06 340/539.27 |
| 2005/0258961 | A1* | 11/2005 | Kimball | G06Q 20/203 340/572.1 |
| 2006/0264221 | A1* | 11/2006 | Koike | B60H 1/00771 455/456.1 |
| 2014/0165614 | A1* | 6/2014 | Manning | F25D 29/00 62/62 |
| 2016/0169578 | A1* | 6/2016 | Linney, II | F25D 11/04 62/56 |
| 2017/0268814 | A1* | 9/2017 | Sigety | F25D 17/06 |

FOREIGN PATENT DOCUMENTS

| | | |
|---|---|---|
| JP | H09-330492 A | 12/1997 |
| JP | 3053238 U | 10/1998 |
| JP | H11-122146 A | 4/1999 |
| JP | 2002-081848 A | 3/2002 |
| JP | 2002-267313 A | 9/2002 |
| JP | 2002-358591 A | 12/2002 |
| JP | 2005-265302 A | 9/2005 |
| JP | 2006-064293 A | 3/2006 |
| JP | 2009-050076 A | 3/2009 |
| JP | 2009-203058 A | 9/2009 |
| JP | 2010-227119 A | 10/2010 |
| JP | 2014-065557 A | 4/2014 |
| JP | 2015-104648 A | 6/2015 |
| JP | 2015-202918 A | 11/2015 |
| JP | 2016-204094 A | 12/2016 |
| JP | 2017-027345 | 2/2017 |

* cited by examiner

FIG. 3

| ID Information | Time |
|---|---|
| 0000000000000001 | 12:21 |
| 0000000000000002 | 12:22 |
| 0000000000000003 | 12:25 |
| 0000000000000004 | 12:28 |
| 0000000000000005 | 15:31 |
| 0000000000000001 | 15:52 |
| . | . |
| . | . |
| . | . |

FIG. 4

| | | Time | | | | | | | |
|---|---|---|---|---|---|---|---|---|---|
| | | 12:20 | 12:30 | 12:40 | ... | 15:30 | 15:40 | 15:50 | 16:00 | ... |
| ID Information | 0000000000000001 | — | 5.0 | 5.0 | | 5.0 | 5.0 | 5.0 | — | |
| | 0000000000000002 | — | 5.1 | 5.0 | | 5.0 | 5.0 | 5.0 | 5.0 | |
| | 0000000000000003 | — | 5.0 | 5.0 | | 5.0 | 4.9 | 5.0 | 5.0 | |
| | 0000000000000004 | — | 5.2 | 5.0 | | 5.0 | 5.0 | 5.0 | 5.0 | |
| | 0000000000000005 | — | — | — | | — | 5.2 | 5.0 | 5.0 | |

COLD STORAGE BOX AND COLD STORAGE BOX MANAGEMENT SYSTEM

CROSS-REFERENCE TO RELATED APPLICATIONS

This application is a U.S. National Phase Application of International Application No. PCT/JP2018/013164, filed on Mar. 29, 2018 and published in Japanese as WO 2019/030969 A1 on Feb. 14, 2019 which is based on and claims the benefit of priority from Japanese Patent Application No. 2017-154134, filed on Aug. 9, 2017. The entire disclosures of all of the above applications are incorporated herein by reference.

BACKGROUND

Technical Field

The present invention relates to a cold storage box which can cold-insulate and house a stored object such as medicine and food and beverages.

Related Art

Unless appropriate temperature control for medicine and food and beverages is conducted, quality deterioration may be caused and disposal thereof may also be forced.

Therefore, developed is a food monitoring device which includes: a history meter capable of detecting a history of chronological temperature variation of food targeted for monitoring and wirelessly transmitting detected data pertinent to the history; and data processors receiving the detected data transmitted from the history meter and monitoring a state of the food targeted for monitoring based on the detected data, and the food monitoring device can monitor a history of temperature variation of frozen foods or the like in real time and accurately transmit monitored data (refer to Japanese Patent Laid-Open No. 9-330492).

In addition, developed is a baggage temperature management device for individually managing temperatures of a plurality of pieces of baggage to be delivered, which includes: temperature detecting means for detecting a temperature of each of the pieces of baggage; storage information storing means for storing storage information showing a storage temperature range for each of the pieces of the baggage; determining means for determining whether or not the temperature detected by the temperature detecting means is out of the storage temperature range shown by the storage information stored by the storage information storing means; alarm information generating means for generating alarm information, when the determining means determines that the temperature is out of the storage temperature range, in order to issue an alarm for an abnormal temperature of the piece of baggage, which corresponds to the determination; and alarm means for issuing the alarm based on the alarm information generated by the alarm information generating means, and the baggage temperature management device can individually manage the temperature of each of the pieces of baggage to be delivered (refer to Japanese Patent Laid-Open No. 2002-267313).

Furthermore, developed is an article temperature management apparatus for managing a temperature of an article with an identification medium recording an article ID attached, to be transported via a plurality of locations attached with location IDs, which includes: a communication processing unit communicably connected to a transport history information storage unit for storing transport history information in which each transport history of the article ID is associated with the location ID and to a location-temperature history information storage unit for storing location-temperature history information in which a temporal change of a location-temperature in each of the plurality of locations is associated with each of the location IDs; a transport history acquisition unit for acquiring, from the transport history information storage unit, the transport history information of a management-targeted article ID, which is an article ID of a management-targeted article, via the communication processing unit; a location-temperature history acquisition unit for acquiring, from the location-temperature history information storage unit, location-temperature history information of a location ID included in the transport history information acquired by the transport history acquisition unit via the communication processing unit; and an article temperature history generating unit for generating article temperature history information providing a temperature history of the management-targeted article upon being transported based on the location-temperature history information acquired by the location-temperature history acquisition unit, and the article temperature management apparatus can acquire the temperature history information of the article with a simplified configuration (refer to Japanese Patent Laid-Open No. 2015-202918).

Moreover, developed is a temperature control apparatus provided in a storage box for storing an article to be subjected to temperature management, which includes: an article ID memory section for storing an article ID for identifying the article; a temperature control section for detecting an ambient temperature of the article in the storage box at a constant cycle by a temperature sensor and generating temperature data including the ambient temperature, the article ID, and a measurement time; a set temperature condition memory section for storing an upper limit value and a lower limit value of the ambient temperature as set temperature conditions; a temperature abnormality determination section for comparing the ambient temperature included in the temperature data with the set temperature conditions and determining whether or not there is temperature abnormality; an elapsed time measuring section for measuring an elapsed time after the article is taken out from the storage box based on a door opening/closing operation of the storage box or a detection result of a tag attached to the article ID; a setting time condition storing section for storing an upper limit value of the elapsed time as a set time condition; a time abnormality determination section for comparing the elapsed time with the set time condition and determining presence or absence of occurrence of time abnormality; and a display section for displaying status information showing presence or absence of occurrence of abnormality relating to the article in accordance with determination results of the temperature abnormality determination section and the time abnormality determination section and the temperature data in real time, and the temperature control apparatus manages the ambient temperature of the article and a transshipping work time on an article-by-article basis and prevents quality deterioration of the article due to a temperature change (refer to Japanese Patent Laid-Open No. 2016-204094).

As described above, in order to ensure safety of quality of the medicine, the food and beverages and the like, apparatuses, each of which can appropriately manage the temperature and confirm that the medicine, the food and beverages and the like are not in an environment in which the quality deterioration is caused, have been developed.

However, among kinds of medicine, medicine for rare diseases (orphan drug) or the like has low demand and is expensive, and thus, once such medicine is distributed to a medical institution or the like, return of the medicine cannot be accepted without assurance that the medicine has been managed at an appropriate temperature and stored. Therefore, the above-mentioned situation has become a barrier against utilization promotion of the medicine for rare diseases (orphan drug) and the like.

A social role of the medicine for rare diseases (orphan drug) and the like as medicine effective for hardly curable intractable diseases is large, and an endeavor for promoting the utilization thereof regardless of the number of patients is required. From the above-described point of view, there has been a growing need of means which makes it possible to confirm that the medicine, the food and beverages, and the like have been managed at an appropriate temperature.

Therefore, the present invention aims to provide a cold storage box which makes it possible to individually confirm that stored objects such as medicine, food and beverages have been managed at an appropriate temperature and also to provide a management system using the cold storage box.

SUMMARY

A cold storage box according to one embodiment of the present invention includes: a storage part capable of housing stored objects; a lid part covering an opening part of the storage part; and a cooling device cooling the storage part, the cold storage box including: an RF tag provided for each stored object and equipped with a temperature sensor; and a control part communicating with the RF tag at appropriate time intervals via an antenna part provided inside the storage part, the control part storing ID information of the RF tag and temperature information sensed by the temperature sensor of the RF tag.

Thus, since temperatures of the individual stored objects housed in the cold storage box can be recorded at the appropriate time intervals, temperature histories of the individual stored objects can be confirmed, and it can be secured that the individual stored objects have been managed at the appropriate temperature.

The cold storage box according to the above-described embodiment can be configured to include an antenna part on an inner surface side of the lid part, and when a stored object is taken out from and is put in the storage part, the control part can communicate with the RF tag via the antenna part provided for the lid part and can store the ID information of the RF tag, and further, can be configured to include an opening and closing sensor sensing an opening and closing state of the lid part, and the control part can make a period of time during which the antenna part provided for the lid part and the RF tag communicate with each other shorter in a state in which the lid part is opened than in a state in which the lid part is closed. Thus, it can be confirmed that the individual stored objects are taken out from and are put in the cold storage box, and further, when the lid part is closed, power consumption of the control part can also be reduced.

In the cold storage box according to the above-described embodiment, the control part can include a transmission part capable of transmitting at least a temperature history of the stored object to an external terminal. Thus, even without moving the cold storage box, the temperature history of the stored object can be easily confirmed from the external terminal, and the temperature history can be stored in the external terminal.

In the cold storage box according to the above-described embodiment, the control part can be configured such that an upper limit temperature and a time limit are set for the control part, the control part detects that a temperature indicated by the temperature information of the stored object is the upper limit temperature or more, and when a period of time during which the temperature indicated by the temperature information of the stored object is the upper limit temperature or more exceeds the time limit, the control part transmits abnormality information to the external terminal to make notification. Thus, it can be recognized on the external terminal that the individual stored objects are in an abnormal state, and quality deterioration of the individual stored objects can be prevented as far as possible.

In the cold storage box according to the above-described embodiment, the control part can be configured such that an upper limit temperature and a time limit are set for the control part, the control part detects that a temperature indicated by the temperature information of the stored object is the upper limit temperature or more, and when a period of time during which the temperature indicated by the temperature information of the stored object is the upper limit temperature or more exceeds the time limit, the control part causes a light emitting part provided for the cold storage box to emit light. In addition, the control part can also be configured such that a taking-out time is set for the control part, and when a period of time during which the ID information of the stored object is not detected exceeds the taking-out time, the control part causes a light emitting part provided for the cold storage box to emit light. Thus, from an outside of the cold storage box, it can be recognized that the stored objects are in the abnormal state, and when there are many cold storage boxes, which cold storage box or boxes have abnormality can be soon found out.

The cold storage box according to the above-described embodiment can have a power receiving part capable of receiving, by radio, electrical power for operating the control part. Thus, for example, by providing the power transmitting part in a site where the cold storage box is stored, since the electrical power can be received while the cold storage box is stored, accumulated power is not lost.

The cold storage box according to the above-described embodiment can be configured such that the antenna part is made of aluminum foil, and the aluminum foil also serves as a thermal insulating material for keeping the storage part cold. Thus, it is not needed to separately provide an antenna, and the cold storage box can be inexpensively produced.

The cold storage box according to the above-described embodiment can be configured such that the cold storage box can be housed in a refrigerator including communication means capable of communicating with the control part, and when the cold storage box is housed in the refrigerator, the cooling device is stopped. Thus, since when the cold storage box is housed in the refrigerator, it is not needed to operate the cooling device of the cold storage box, the cooling device is automatically stopped, thereby allowing electrical power consumed by the cooling device to be reduced.

The cold storage box according to the above-described embodiment can be configured such that the RF tag includes a battery part and a memory part capable of storing information on temperatures measured at appropriate time intervals by electrical power of the battery part when a period of time during which the RF tag and the control part do not communicate with each other exceeds a set time. Thus, even when the control part comes not to work due to power shortage or the like, the RF tag manages the temperature history, thereby making it possible to confirm also in such a case that the stored objects have been managed at the appropriately temperature.

The cold storage box according to the above-described embodiment can be configured such that the RF tag includes a light emitting part emitting light when a temperature indicated by the temperature information exceeding a set upper limit temperature is detected. Thus, when there are many stored objects, which stored object or objects have abnormality can be soon found out.

A cold storage box management system can be configured by using the cold storage box according to the above-described embodiment, and for example, the cold storage box management system can be configured such that the cold storage box is conveyed on a belt conveyor, a temperature history of each stored object housed in the cold storage box being conveyed is received by a temperature management apparatus, and when a set upper limit temperature in the temperature history is determined to have been exceeded, the temperature management apparatus controls sorting-out of the cold storage boxes.

Thus, the stored objects can be easily sorted into stored objects which have been managed at the appropriate temperature and stored objects which have been in the abnormal state.

In the cold storage box management system according to the above-described embodiment, temperature histories of the individual stored objects received by the temperature management apparatus can be stored in a memory part of a cloud server. Thus, a computer or the like or a mobile terminal or the like is connected to the Internet or the like, thereby allowing the temperature histories of individual stored objects to be confirmed and managed from an outside of an institution.

BRIEF DESCRIPTION OF THE DRAWINGS

FIG. 3 is a table showing one example of ID information stored in a memory part of the control part in the cold storage box in FIG. 1.

FIG. 4 is a table showing one example of temperature information and ID information stored in the memory part of the control part in the cold storage box in FIG. 1.

DETAILED DESCRIPTION

Hereinafter, a cold storage box according to one embodiment of the present invention will be described. However, the present invention is not limited to this embodiment.

Figure 1:
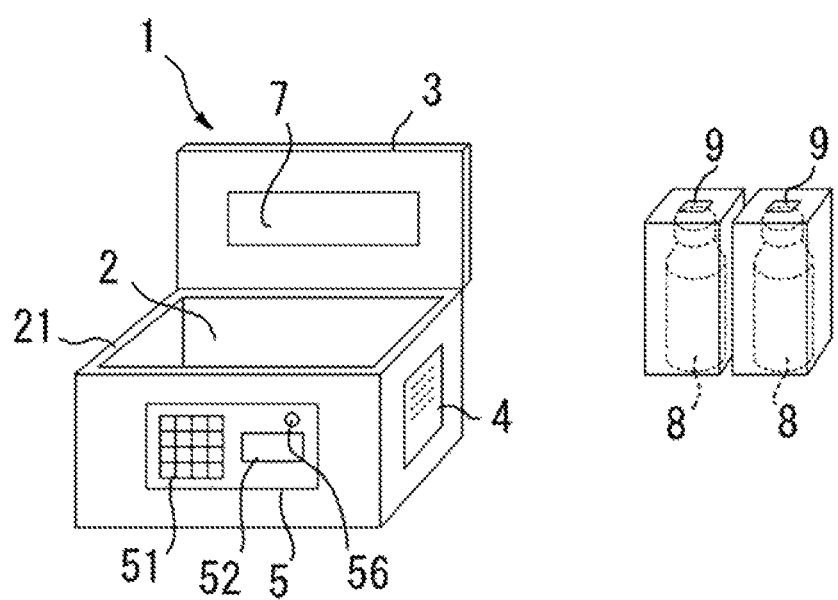
FIG. 1 is a perspective view showing a cold storage box according to one embodiment of the present invention.
Figure 2:
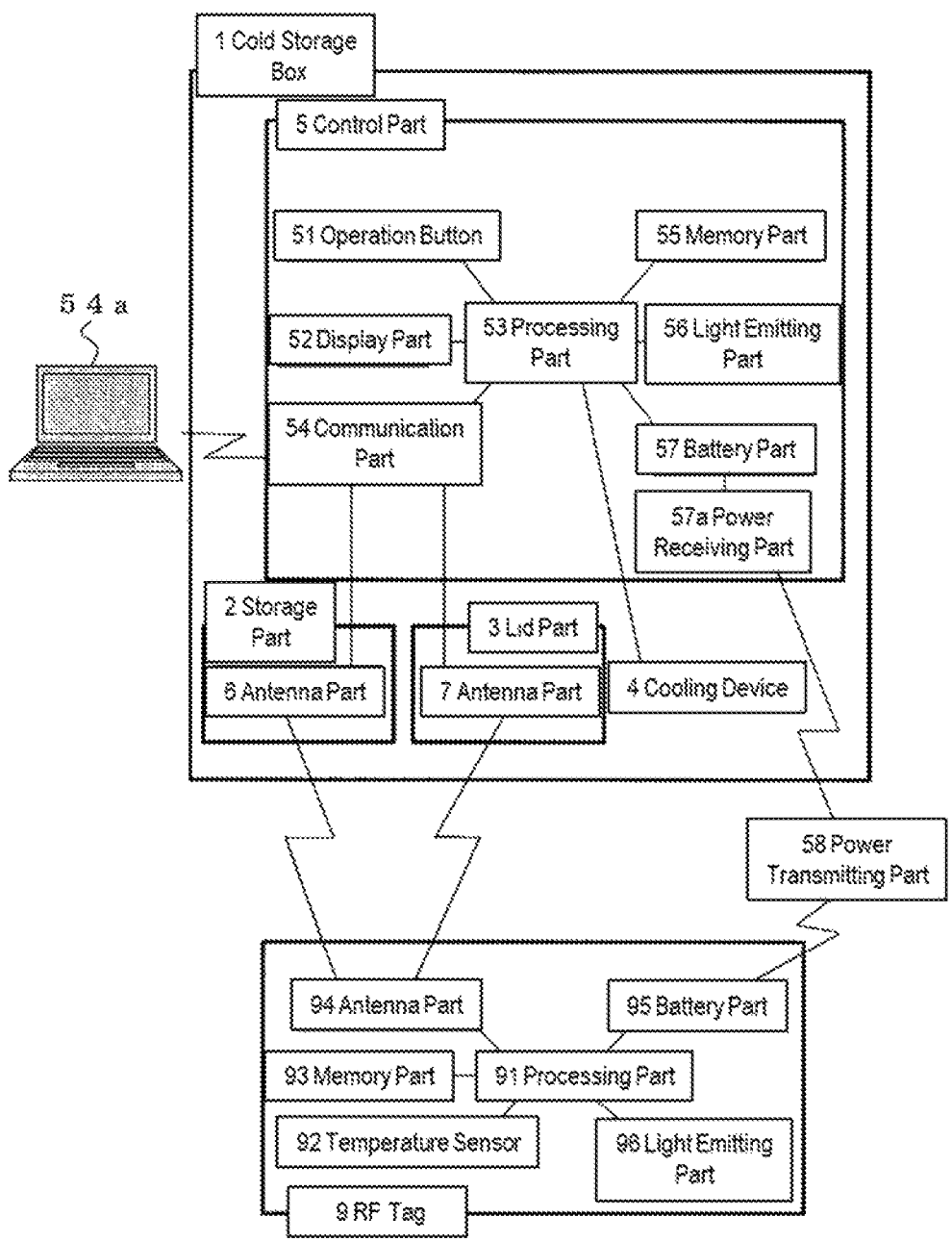
FIG. 2 is a diagram showing an example of a configuration such as a control part in the cold storage box in FIG. 1.

As shown in FIG. 1 or FIG. 2, the cold storage box 1 according to one embodiment of the present invention includes a storage part 2, a lid part 3, a cooling device 4, and a control part 5.

The cold storage box 1 is made of, for example, a thermal insulating material or the like such as foamed polystyrene and is made capable of keeping an inside of the storage part 2 at a low temperature by closing the lid part 3.

In the present embodiment, the storage part 2 an upper portion of which is an opening part 21 is formed in a rectangular box-like shape and is capable of housing stored objects 8 each including an RF tag 9 with a temperature sensor. The storage part 2 can house at least one stored object 8 and can house stored objects 8 the number of which is, for example, 10, 20, 30, or the like. On a bottom surface side of the storage part 2, an antenna part 6 is provided.

Although in the present embodiment, the antenna part 6 is provided on the bottom surface side of the storage part 2, the present invention is not limited to this, it is only required for the antenna part 6 to be provided on an inner surface side of the storage part 2, and the antenna part 6 may be provided on a side surface of the storage part 2.

Although each of the stored objects 8 is not particularly limited, each of the stored objects 8 is an object for which cooling management is required, and for example, medicine, food and beverages, and the like are cited, and specifically, blood, medicine for rare diseases (orphan drug), rice wine, wine, and the like can be cited.

The lid part 3 is made capable of covering the opening part 21 in a sealed manner and of being rotatably opened and closed on a back surface side of the cold storage box 1 in a hinged manner. In addition, on an inner surface side of the lid part 3, an antenna part 7 is provided. It is preferable that the lid part 3 vertically stands still in a state in which the lid part 3 is opened, in order to allow the antenna part 7 and the RF tag 9 to surely communicate with each other.

The lid part 3 can be provided with an opening and closing sensor, and the opening and closing sensor senses an opening and closing state of the lid part 3, thereby allowing the control part 5 to be notified of the opening and closing state. The opening and closing sensor may be a conventionally heretofore known opening and closing sensor.

In the present embodiment, the cooling device 4 is provided on a side surface of the storage part 2 and includes, for example, a temperature sensor, a Peltier device, and the like and is made capable of cooling the inside of the storage part 2 and of keeping the inside thereof at a set temperature. It is preferable that operations of the cooling device 4 such as setting of the temperature can be made by using the control part 5.

In the present embodiment, the control part 5 is provided on a front surface side of the storage part 2 and as shown in FIG. 1 or FIG. 2, the control part 5 is provided with an operation button 51 and a display part 52 for displaying information contents and includes a processing part 53, a communication part 54, a memory part 55, a light emitting part 56, a battery part 57, and the like.

The control part 5 also has a function of a reader/writer of the RF tag 9.

The operation button 51 includes, for example, a keyboard, a numeric keypad, and the like, is capable of setting an upper limit temperature and a time limit of each of the stored object 8, and is also capable of, for example, operating the cooling device 4.

The display part 52 is composed of, for example, a display made of liquid crystal or the like, allows a set upper limit temperature, a set time limit, and the like to be confirmed, and allows temperature information, sensed by the RF tag 9, and the like to be confirmed.

The processing part 53 includes a CPU, performing operation processing, and the like and is capable of executing stored programs and of thereby performing information processing.

The communication part 54 includes antenna parts 6 and 7, is capable of communicating with the RF tag 9, and is capable of communicating with an external terminal 54a and the like.

The antenna part 6 is made capable of communicating with the RF tag 9 of each of the stored objects 8 housed in the storage part 2, transmits radio waves at appropriate time intervals via the antenna part 6 in response to an instruction of the control part 5, the RF tag 9 receives the radio waves, and the RF tag 9 is made to reply ID information and temperature information to the control part 5.

The antenna part 7 is made capable of communicating with the RF tag 9 when each of the stored objects 8 passes through the vicinity of the opening part 21, that is, when each of the stored objects 8 enters and leaves the storage part 2, transmits radio waves at appropriate time intervals via the antenna part 7 in response to an instruction from the control part 5, the RF tag 9 receives the radio waves, and the RF tag 9 is made to reply at least ID information to the control part 5.

It is preferable that the antenna parts 6 and 7 are made of aluminum foil and thus, can serve also as a thermal insulating material. At this time, it is preferable that the aluminum foil of the antenna parts 6 and 7 is insulated from peripheral portions. Although a distance at which the RF tag 9 and antenna parts 6 and 7 can communicate with each other depends on a size of the cold storage box 1, it is preferable that the distance is set to approximately 5 cm to 50 cm. When each of the stored object 8 is housed in the storage part 2, the antenna part 6 is provided in a position where the RF tag 9 comes in this range, and when each of the stored objects 8 is taken out from and is put in the storage part 2, the antenna part 7 is provided in a position where the RF tag 9 passes through this range.

As the external terminal 54a, for example, a personal computer, a portable phone (smartphone), and the like can be used. Transmission, of the ID information and the temperature information stored in the memory part 55 to the external terminal 54a, and the like can be performed. It is preferable that communication with the external terminal 54a is performed in conformity with a communication standard such as Bluetooth (registered trademark).

The memory part 55 is constituted of a memory, a HD, and the like and can store programs for executing the processing part 53 and information such as the temperature information and the ID information.

The light emitting part 56 includes light emitting means which emits light when abnormality of each of the housed stored objects 8 is sensed, occurrence of the abnormality of each of the housed stored objects 8 can be notified by causing the light emitting means to emit light, and the abnormality in the stored objects 8 can be sensed from an outside of the cold storage box 1. As the light emitting means, an LED or the like can be used.

The battery part 57 can supply electrical power for driving the control part 5, it is preferable that the battery part 57 is chargeable, and in particular, it is preferable that the battery part 57 includes a power receiving part 57a which is chargeable by radio.

In the present embodiment, the RF tag 9 includes, a processing part 91, a temperature sensor 92, a memory part 93, an antenna part 94, a battery part 95, a light emitting part 96, and the like.

As the RF tag 9, any of a passive tag, an active tag, a semi-active tag, and the like may be used.

The processing part 91 is to control the RF tag 9 and includes an IC and the like.

The temperature sensor 92 can sense an ambient temperature of the RF tag 9. The sensed temperature is stored in the memory part 55 of the control part 5 or the like as temperature information.

The memory part 93 can store the temperature information, a unique ID, and the like and when the RF tag 9 cannot communicate with the control part 5 due to communication failure or the like, can store the temperature information.

The antenna part 94 is included to communicate with the control part 5. The RF tag 9 receives radio waves from the control part 5 via the antenna part 94, transmits the radio waves to the processing part 91, and the processing part 91 can reply the temperature information, the ID information, and the like via the antenna part 94 to the control part 5.

The battery part 95 is to supply electrical power for driving the RF tag 9. When the RF tag 9 is the passive tag, no battery part 95 may be included. Although the battery part 95 may be an exchangeable type battery part using, for example, dry-cell batteries, it is preferable that the battery part 95 can be charged by radio.

The light emitting part 96 includes light emitting means which emits light when the RF tag 9 cannot communicate with the control part 5 due to communication failure or the like, and occurrence of abnormality can be notified by causing the light emitting means to emit light. As the light emitting means, an LED or the like can be used.

Hereinafter, one example of a method of using the cold storage box 1 is shown.

First, each stored object 8 is equipped with each RF tag 9. In this case, the RF tag 9 may be directly attached to the stored object 8, and each of the stored objects 8 is put in a box or a case, the RF tag 9 may be attached onto the box or the case. It is only required for the RF tag 9 to be provided for each of the stored objects 8, and the RF tag 9 may be tied with a string and may be enclosed in a box and a case.

In the present example, a unique ID of the RF tag 9 is used as ID information. It is preferable that the ID information is previously associated with a trade name of each of the stored objects 8 which is provided with the RF tag 9, for example, in the external terminal 54a. Note that in the present embodiment, description is made such that the ID information is constituted of a 16-digit numerical value.

The cold storage box 1 is set as described below.

The control part 5 is set such that the control part 5 communicates with the RF tag 9 housed in the storage part 2 at appropriate time intervals via the antenna part 6 and replies the temperature information sensed by the temperature sensor 92 from the RF tag 9. At this time, the ID information is also replied. Each of these time intervals can be set to, for example, each one minute, each five minutes, each ten minutes, each 20 minutes, or the like.

In addition, the control part 5 is set such that the control part 5 communicates with the RF tag 9 via the antenna part 7 at appropriate time intervals and replies the ID information of each of the stored objects 8, which has passed through the vicinity of the opening part 21 of the cold storage box 1. Each of these time intervals can be set to, for example, each 0.1 seconds, each 0.5 seconds, each one second, each two seconds, or the like. The inside of the storage part 2 is set to be kept at 5.0° C.

In order to house the stored objects 8 in the cold storage box 1, the storage part 2 is opened by opening the lid part 3 of the cold storage box 1 and the stored objects 8 are housed in the storage part 2. Upon housing each of the stored objects 8, the RF tag 9 passes through the opening part 21 of the storage part 2, communicates with the control part 5 via the antenna part 7 and replies the ID information to the control part 5. The ID information is stored in the memory part 55. The time at this time is also stored therein. In the memory part 55, for example, as shown in FIG. 3, the ID information is stored.

Thereafter, the lid part 3 of the cold storage box 1 is closed and the stored objects 8 can be thereby stored. The control part 5 transmits the radio waves via the antenna part 6 at the appropriate time intervals, each RF tag 9 provided for each of the stored objects 8 housed in the storage part 2 replies the temperature information sensed by the temperature sensor 92 and the ID information, the control part 5 receives the temperature information and the ID information via the antenna part 6, and the temperature information and the ID information are stored in the memory part 55 of the control part 5. The time at this time is also stored. In the memory part 55, for example, as shown in FIG. 4, the temperature information and the ID information are stored. Note that in FIG. 4, a case in which the temperature information is detected at each interval of 10 minutes is shown, and each mark "-" in FIG. 4 indicates that no temperature information is detected.

In the memory part 55 of the control part 5, as shown in FIG. 3 or FIG. 4, the time at which each of the stored objects 8 passes through the vicinity of the opening part 21 of the cold storage box 1 is stored for each ID information, and each temperature information and the time at which the temperature is measured are stored. Based on these pieces of information, the display part 52 is caused to display a temperature history, and the temperature history of each of the stored objects 8 inside the cold storage box 1 can be thereby confirmed. In addition, communication with the control part 5 from the external terminal 54a is conducted by radio or the like, the temperature information is transmitted via the communication part 54 of the control part 5, and the temperature history of each of the stored objects 8 can also be confirmed on the external terminal 54a.

The control part 5 also allows the upper limit temperature and the time limit to be set, and the temperature information is cross-checked against the upper limit temperature and when a period of time during which a temperature indicated by the temperature information is the upper limit temperature or more exceeds the time limit, abnormality information is transmitted to the external terminal 54a or the like, thereby enabling notification. This transmission of the abnormality information can be conducted by E-mail or the like. This upper limit temperature can be set to, for example, −10° C., 0° C., 5° C., or the like, and this time limit can be set to, for example, three minutes, five minutes, ten minutes, or the like.

Instead of the transmission of the abnormality information or together with the transmission of the abnormality information, when the period of time during which the temperature of the stored objects 8 is the upper limit temperature or more exceeds the time limit, the light emitting part 56 provided for the control part 5 can be caused to emit light. Thus, from the outside of the cold storage box 1, the occurrence of the abnormality in the stored objects 8 inside the box can be recognized. This upper limit temperature can be set to, for example, −10° C., 0° C., 5° C., or the like, and this time limit can be set to, for example, three minutes, five minutes, ten minutes, or the like.

The cold storage box 1 can be provided with the opening and closing sensor for sensing the opening and closing state of the lid part 3, and periods of time of the communication with the RF tag 9 via the antenna part 7 can be changed between the opening and closing state of the lid part 3. For example, a period of time in the opening state of the lid part 3 is set to each 0.1 seconds, each 0.5 seconds, each one second, each two seconds or the like, and a period of time in the closing state of the lid part 3 is set to each one minute, each five minutes, each ten minutes, each 20 minutes or the like, thereby allowing the stored objects 8 passing through the opening part 21 to be surely detected and enabling power consumption of the control part 5 in the closing state of the lid part 3 to be reduced.

Upon taking out each of the stored objects 8 housed in the cold storage box 1, each of the stored objects 8 is taken out by opening the lid part 3. At this time, the RF tag 9 communicates with the control part 5 via the antenna part 7, replies the ID information of the RF tag 9, and the ID information is stored in the memory part 55. The time at this time is also stored in the memory part 55.

The control part 5 allows a taking-out time to be set, the unique ID of the RF tag 9 provided for each of the stored objects 8 is detected as the ID information via the antenna part 7, and thereafter, a period of time during which the same unique ID as that unique ID is not detected by the antenna part 6 exceeds the taking-out time, the light emitting part 56 can be caused to emit light. Thus, from the outside of the cold storage box 1, the occurrence of the abnormality in the stored objects 8 inside the box can be recognized. This taking-out time can be set to, for example, 30 minutes, 60 minutes, 90 minutes or the like.

It is preferable that a power transmitting part 58 is provided in the vicinity of a storage place of the cold storage box 1, and thus, electrical power is received by the power receiving part 57a by radio (wireless) power transmission and the battery part 57 can be thereby charged while the cold storage box 1 is stored in the storage place.

In addition, the storage place of the cold storage box 1 may be a refrigerator. It is preferable that when the cold storage box 1 is housed in the refrigerator, this refrigerator automatically communicates with the control part 5 and stops the cooling device 4. Thus, since it is not needed for the cooling device 4 to operate inside the refrigerator, electrical power consumed by the cooling device 4 is reduced, and consumption of batteries of the battery part 57 can be reduced.

It is preferable that the RF tag 9 receives electrical power inside the cold storage box 1 by radio (wireless) power transmission, thereby allowing the battery part 95 to be charged. At this time, it is preferable that the RF tag 9 can receive the electrical power from the power transmitting part 58.

In addition, it is preferable that in order to prepare for a case in which the RF tag 9 and the control part 5 cannot communicate with each other due to exhaustion of the battery part 57 in the control part 5 or the occurrence of malfunction or the like thereof, a setting time is set for the RF tag 9 and in a case in which a period of time during which the RF tag 9 and the control part 5 cannot communicate with each other exceeds the setting time, the temperature information sensed by the temperature sensor 92 is stored in the memory part 93 of the RF tag 9. Thus, also in a case in which the communication with the control part 5 is made impossible due to some circumstances, the temperature information can be stored, thereby allowing the temperature history of each of the stored objects 8 to be confirmed. It is preferable that the setting time is set by using the operation button 51 of the control part 5 or the like, and the setting time can be set to, for example, 10 minutes, 30 minutes, 60 minutes, or the like.

The RF tag 9 can set the upper limit temperature, and in a case in which the temperature information stored in the memory part 93 exceeds the upper limit temperature, the light emitting part 96 can be caused to emit light. Thus, the occurrence of abnormality in the stored objects 8 provided with the RF tag 9 can be recognized from the outside. It is preferable that this upper limit temperature is set by using the operation button 51 of the control part 5 or the like, and the upper limit temperature can be set to, for example, −10° C., 0° C., 5° C., or the like.

As described above, the cold storage box 1 allows the temperature history of each of the stored objects 8 to be stored in the memory part 55 and the temperature history to be confirmed on the display part 52 or the external terminal 54a and enables confirmation that the stored objects 8 such as the medicine or the food and beverages have been managed at the appropriate temperature.

A cold storage box management system below described can be configured by using the cold storage box 1.

Figure 5:
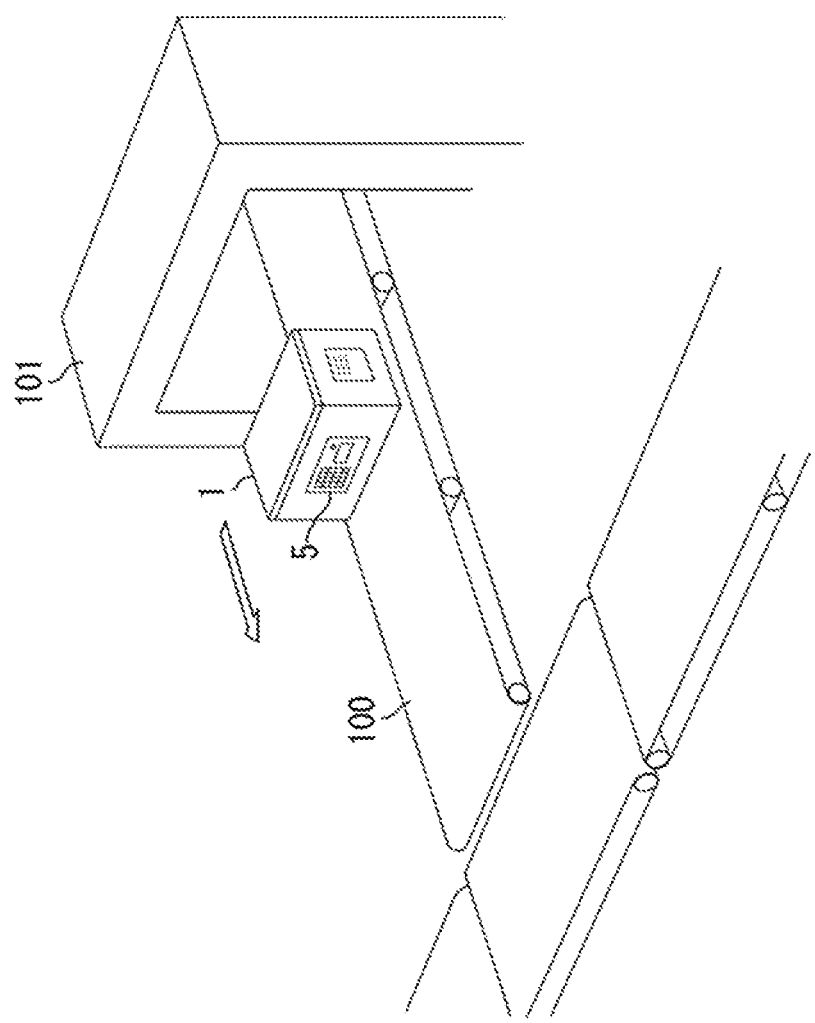
FIG. 5 is a schematic view showing one example of a cold storage box management system using the cold storage box in FIG. 1.

As shown in FIG. 5, the cold storage box 1 having stored the stored objects 8 is conveyed on a belt conveyor 100. The belt conveyor 100 is provided with a temperature management apparatus 101, and the temperature management apparatus 101 can communicate with the control part 5 of the cold storage box 1 and can receive at least the temperature information stored in the memory part 55 via the communication part 54.

The temperature management apparatus 101 includes a control part constituted of a CPU and the like, allows an upper limit temperature to be set, and can detect whether any stored object 8 or stored objects 8 having temperature information which has exceeded the upper limit temperature is or are present, by cross-checking the received temperature information and ID information. When the detected stored object 8 or stored objects 8 is or are present, the cold storage box 1 housing that stored object 8 or those stored objects is or are sorted. In order to sort that stored object 8 or those stored objects, for example, the belt conveyor 100 is branched, and a flowing direction thereof is divided, and the cold storage box 1 housing a stored object 8 or stored objects 8, the temperature or temperatures of which have exceeded the upper limit temperature, and the cold storage box 1 housing no stored object 8, the temperature of which has exceeded the upper limit temperature, are segregated, thereby allowing the stored object 8 or stored objects 8 having the likelihood of the occurrence of the abnormality to be sorted out.

As described above, by cross-checking the temperature information of each of the individual stored objects 8, it can be confirmed whether any abnormality of the temperature has occurred upon the management thereof, and the stored objects 8 which have been appropriately managed and the stored objects 8 which may have been inappropriately managed can be sorted out.

It is preferable that the temperature information of each cold storage box 1, received by the temperature management apparatus 101, is stored in a memory part of a cloud server. Thus, a computer or the like or a mobile terminal or the like is connected to the Internet or the like, thereby allowing the temperature histories of individual stored objects 8 to be confirmed and managed from an outside of an institution.

The invention claimed is:

1. A cold storage box comprising:
a storage configured to house at least one stored object;
a lid configured to cover an opening of the storage;
a cooling device configured to cool the storage;
an RF tag provided for the stored object and equipped with a temperature sensor, the temperature sensor being configured to measure a temperature of the stored object;
a first antenna provided at an inside of the storage;
a second antenna provided at an inner surface side of the lid; and
a controller including a processor and a memory, the processor being configured to execute a program stored in the memory so to:
communicate with the RF tag of the stored object at a first appropriate time interval via the first antenna to obtain ID information of the RF tag and temperature information of the stored object measured by the temperature sensor;
store the ID information of the RF tag and the temperature information of the stored object into the memory;
communicate with the RF tag of the stored object during taking the stored object out from or placing the stored object in the storage via the second antenna in a first state in which the lid is opened to obtain the ID information of the RF tag and taken-out and placed-in time information of the stored object; and
store the ID information of the RF tag of the stored object, which is taken out from or placed in the storage, and the taken-out and placed-in time information of the stored object into the memory.

2. The cold storage box according to claim 1, further comprising:
an opening and closing sensor configured to sense an opening and closing state of the lid,
wherein the processor is configured to communicate with the RF tag at a second appropriate time interval via the second antenna in the first state detected by the opening and closing sensor,
the processor is configured to communicate with the RF tag at a third appropriate time interval via the second antenna in a second state detected by the opening and closing sensor, and the lid is closed in the second state, and
the second appropriate time interval is shorter than the third appropriate time interval.

3. The cold storage box according to claim 1,
wherein the controller includes a communication interface configured to transmit at least the temperature information of the stored object to an external terminal.

4. The cold storage box according to claim 3,
wherein, when the processor detects that a temperature indicated by the temperature information of the stored object is an upper limit temperature or more and that a period of time during which the temperature indicated by the temperature information of the stored object is the upper limit temperature or more exceeds a predetermined period of time, the processor is configured to transmit abnormality information to the external terminal via the communication interface to make notification.

5. The cold storage box according to claim 1,
wherein, when the processor detects that a temperature indicated by the temperature information of the stored object is an upper limit temperature or more and that a period of time during which the temperature indicated by the temperature information of the stored object is the upper limit temperature or more exceeds a predetermined period of time, the processor is configured to cause a light emitter provided for the cold storage box to emit light.

6. The cold storage box according to claim 1,
wherein, when a period of time during which the ID information is not detected by the first antenna exceeds a taking-out time, the processor is configured to cause a light emitter provided for the cold storage box to emit light.

7. The cold storage box according to claim 1, further comprising:
a power receiver configured to receive, by radio, electrical power for operating the controller.

8. The cold storage box according to claim 1,
wherein each of the first and second antennas is made of aluminum foil, and the aluminum foil also serves as a thermal insulating material.

9. The cold storage box according to claim 1,
wherein the cold storage box is configured to be housed in a refrigerator, and the processor is configured to communicate with the refrigerator, and
when the cold storage box is housed in the refrigerator, the processor is configured to stop an operation of the cooling device.

10. The cold storage box according to claim 1,
wherein the RF tag includes a tag battery and a tag memory, and
the tag memory is configured to store information on temperatures measured by the temperature sensor at a fourth appropriate time interval by electrical power of the tag battery when a period of time during which the RF tag and the controller do not communicate with each other exceeds a set time.

11. The cold storage box according to claim 10,
wherein the RF tag includes a tag light emitter, and the tag light emitter is configured to emit light when a temperature indicated by the temperature information exceeding a set upper limit temperature is detected.

12. A cold storage box management system comprising:
the cold storage box according to claim 1, the cold storage box being conveyed on a belt conveyor; and
a temperature management apparatus including an apparatus processor, the apparatus processor is configure to:
receive the temperature information of the stored object housed in the cold storage box that is conveyed;
compare between a temperature of the temperature information and a set upper limit temperature; and
sort out the cold storage box when the apparatus processor determines that the temperature of the stored object housed in the cold storage box exceeds the set upper limit temperature.

13. The cold storage box management system according to claim 12,
wherein the temperature information received by the temperature management apparatus is stored in a server memory of a cloud server.

14. The cold storage box according to claim 1,
wherein the stored object is one of medicine, wine, or rice wine.

15. The cold storage box according to claim 2,
wherein the stored object is one of medicine, wine, or rice wine.

* * * * *